No. 898,069. PATENTED SEPT. 8, 1908.
J. F. SCHOEPPL.
HOOK AND EYE.
APPLICATION FILED SEPT. 19, 1906.
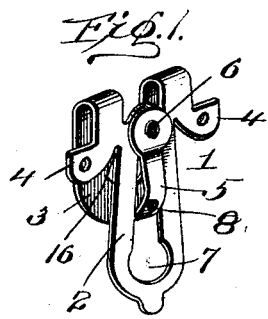
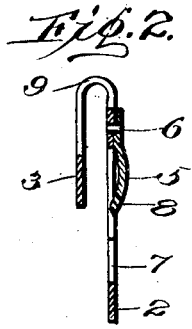
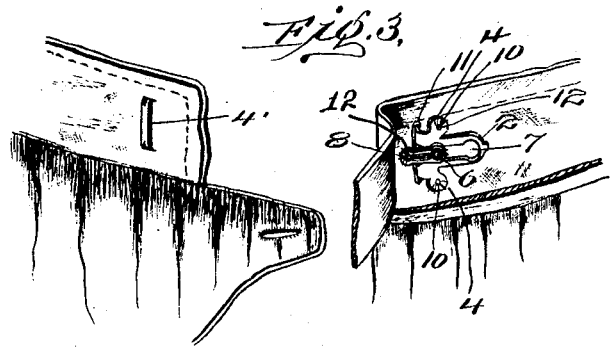
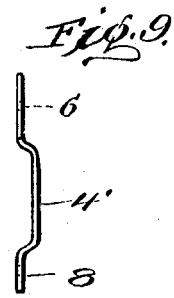
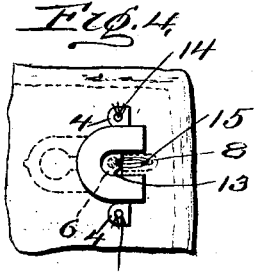
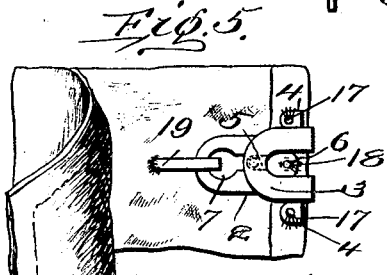
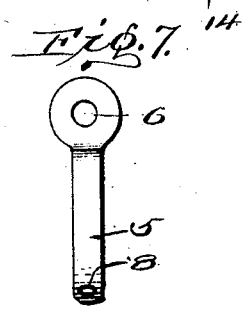
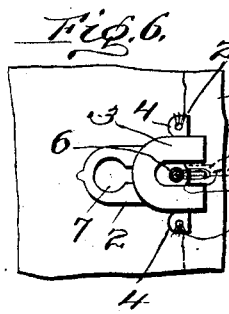
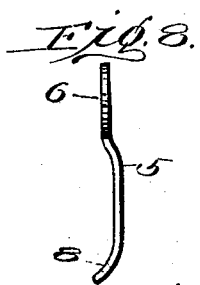
Witnesses
J. M. Fowler Jr.
A. S. Kitchin
Inventor
Joseph F. Schoeppl
By
Mason, Fenwick & Lawrence
his Attorneys.

UNITED STATES PATENT OFFICE.

JOSEPH F. SCHOEPPL, OF BALTIMORE, MARYLAND.

HOOK AND EYE.

No. 898,069.  Specification of Letters Patent.  Patented Sept. 8, 1908.

Application filed September 19, 1906. Serial No. 335,245.

*To all whom it may concern:*

Be it known that I, JOSEPH F. SCHOEPPL, a citizen of the United States, residing at Baltimore, in the State of Maryland, have invented certain new and useful Improvements in Hooks and Eyes; and I do hereby declare the following to be a full, clear, and exact description of the invention, such as will enable others skilled in the art to which it appertains to make and use the same.

This invention is an improvement in hook and eye or like connecting devices and especially in the hooks for use in fastening trousers; and the invention comprises certain novel constructions and combinations of parts as will be hereinafter described and claimed.

In the drawing: Figure 1 is a detail perspective view of my improved connecting device. Fig. 2 is a longitudinal section thereof. Fig. 3 is a perspective view showing the hook applied with the tongue and lateral eyes in one adjustment, and Figs. 4, 5 and 6 are elevations of the hook applied showing different modes of applying the same. Fig. 7 is an enlarged plan view of the bar or tongue used in connection with my device. Fig. 8 is an edge view of the device shown in Fig. 7. Fig. 9 is an edge view of a bar forming part of my invention.

While my hook embodies certain improvements, I have endeavored to so carry out the improvements as to permit the application of the hook in the manner now ordinarily practiced, so that the improved hook can be applied in accordance with the improved constructions or in any of the ordinary ways common to the tailoring trade.

The connecting device 1, as best shown in Figs. 1 and 2 includes the body 2 bent at one end to form the return hook 3 and preferably supplied at about the base of said hook with the lateral perforated lugs 4 forming eyes which may be utilized in stitching the connecting device in place on the garment, as shown in Figs. 3 to 6. To the body 2 I pivot one end of the tongue or bar 5 at 6, the pivoting being preferably effected by means of the eyelet as shown to afford a stitching opening at the union of the tongue with the body 2. The pivot 6 of the tongue 5 is preferably located approximately midway between the sides of the hook 3 and at about the base of said hook and the tongue 5 is of such length as to protrude beyond the hook 3 when adjusted to the position shown in Fig. 3 and illustrated in dotted lines in Figs. 4 and 6 and to underlie the body 2 when adjusted to the position shown in Figs. 1 and 2, the free end of the tongue 5 being preferably deflected toward the body 2 so such end will project into the opening 7 of the body 2 as shown in Fig. 2 in order to permit no projection to obstruct the insertion of the body 2 in the garment in the application of the device thereto in the manner shown in Figs. 3 and 4. The tongue or bar 5 is provided near its free end with an opening 8 for the passage of the stitches in sewing the hook in place, as presently described.

The hook 3 is provided with an opening 9 arranged between its side edges in such manner as to permit the passage of the thread in sewing through the openings 6 and 8 over and over, after the fashion of sewing a button, to secure the hook to the garment as shown in Figs. 3, 4 and 6 and also to permit the stitching of the connecting device in place in the adjustment of parts shown in Fig. 5. It will be noticed therefore that I provide the connecting device with a hook and with a base portion or body and provide the body midway between the sides of the hook with a stitching opening at 6 and forming an opening in the hook which permits the stitching of the device through the opening 6 in order to secure the same in place as desired. I also provide the connecting device with a tongue or bar which may be turned back as shown in Figs. 1 and 2 when it is desired to insert or remove the connecting device to or from the position shown in Fig. 3 and can be turned forward to the position shown in Fig. 3, and in dotted lines in Fig. 4 and 6 to assist in securing the device in place on the garment.

In forming the tongue or bar 5 it may be produced by cutting it wholly out of the body 2, thus producing the opening 7 and avoiding any waste of material in the manufacture of the device and consequently forming both the hook and bar from a very small amount of material. The member 2 is made of any desired length so that the metal forced from the center thereof may be used as the tongue or bar 5 as clearly shown in Fig. 3, or if preferable, may be used as the bar or eye 4'. When it is desired to use the tongue 5 as the bar 4', as shown in Fig. 3 of the drawings, the bar or tongue 5 must be provided from some other source, as for instance, from the front part of the hook proper, or from any other source as may be desired. In using the tongue or bar 5 for the bar or eye 4', I bend the end containing the opening 8 so as to be in the same plane as the end provided with the opening 6 as clearly seen in Fig. 9 of the drawing.

In Figs. 3, 4, 5 and 6 I show different ways of applying the connecting device, that shown in Fig. 3 being the one which is preferred ordinarily and for which the device is especially adapted although it may be preferred in some instances to apply the device as shown in Figs. 4, 5 and 6.

In the construction shown in Fig. 3 the fly is provided with a slit 11 and the device may be applied thereto by passing the hook 3 from the inner side through the slit 11, the tongue 5 projecting forwardly beyond the slit 11 and stitches 12 being turned through the openings 6 and 8 over and over as in sewing a button to secure the device in place, the eyes 4 being also stitched in place as shown at 10 in Fig. 3.

In the arrangement shown in Fig. 4, the connecting device is applied to the garment by slitting the latter at 13 and inserting the body 2 with the tongue 5 in the position shown in Fig. 2 through the slit 13, the hook 3 and the eyes 4 standing on the same side of the garment, the eyes 4 being stitched to the garment at 14 and the tongue 5 being adjusted to project in the opposite direction from the body 2 and being stitched at 15 as shown. In the arrangement of parts shown it will be noticed that the eyes 4 being undercut at 16 on the opposite side from the hook 3, will permit the body 2 to be inserted almost its full length through the slit 13.

In the arrangement shown in Fig. 5 the tongue 5 is turned to the position shown in Fig. 2 and the connecting device is stitched at 17 through the eyes 4 and at 18 through the opening 6 and a tape 19 may be arranged to connect the body 2 with the garment.

In the arrangement shown in Fig. 6 the garment is formed with the hem 20 and the tongue 5 is adjusted to the position shown in dotted lines and projects within the hem and forms a gage in applying the connecting device to the garment, such device being stitched at 21 through the openings 6 and 8 and at 22 through the eyes 4.

It will be understood from the foregoing that my connecting device may be connected to the garment in various ways and stitched securely in each instance. It will be also understood that the hook will hold without sewing or stitching, as will be clearly seen in Fig. 3 of the drawings. The member 5 will act as a shoulder or hook when strains are exerted upon the hook 3, and consequently hold the connecting device in operative position. Of course, it will be understood that when the member or tongue 5 is used for the bar or eye 4', the connecting means must be secured in place by stitches as shown in Fig. 5, or another bar provided to act in a similar manner to the bar 5.

Having thus fully described my invention, what I claim as new and desire to secure by Letters Patent is:—

1. A connecting device in the nature of a fastening hook for trousers comprising a base, a hook returned from one end of the base and having an opening between its sides, a tongue provided with an opening near its free end, an eyelet connecting the other end of the tongue pivotally with the base in line with the opening in the hook, and lateral eyes projecting from the opposite sides of the base about in line with the eyelet in the base and undercut at their base for forming the eyelet substantially as set forth.

2. A connecting device for use as a fastening hook on trousers comprising a base, a hook bent from one end of the base and returned thereover and provided between its sides with an opening, and a tongue pivoted to the base approximately midway between the sides of the hook and provided in its free end with a stitching opening, and a stitching opening in the base in line with the opening through the hook whereby stitches may be passed over and over through the opening in the base and the opening in the free end of the tongue after the fashion of sewing on a button substantially as set forth.

3. A connecting device for use as a fastening hook on trousers and consisting of a base, a hook bent from one end of the base and returned thereover and provided with an opening midway between its sides, a tongue provided at one end with an opening, an eyelet connecting the other end of said tongue pivotally with the base in line with the opening through the hook and approximately midway between the sides of the hook, and lateral eyes at the opposite sides of the base, the tongue being adapted for adjustment to underlie the base or project from the base beyond the hook, and the eyelet and the opening in the free end of the hook permitting the stitching of the device in place, substantially as set forth.

In testimony whereof I affix my signature in presence of two witnesses.

JOSEPH F. SCHOEPPL.

Witnesses:
JOHN THOMAS SCHEN,
J. MORRIS OREM.